United States Patent

[11] 3,596,042

[72] Inventor Jerome Vincent Volk
 Union, N.J.
[21] Appl. No. 815,997
[22] Filed Apr. 14, 1969
[45] Patented July 27, 1971
[73] Assignee Griffiths Electronics Inc.
 Linden, N.J.

[54] TABBING MACHINE
 11 Claims, 3 Drawing Figs.
[52] U.S. Cl. ............................................ 219/80,
 83/580, 226/156, 226/187, 226/191
[51] Int. Cl. ........................................... B23k 11/00
[50] Field of Search .................................. 226/176,
 177, 186, 191, 142, 156, 181, 190, 194; 83/156,
 580; 219/80

[56] References Cited
 UNITED STATES PATENTS
 2,804,968 9/1957 Elliott ........................... 226/186
 3,074,608 1/1963 Ohme ........................... 226/156 X Primary Examiner—Richard A. Schacher
Attorney—Ostrolenk, Faber, Gerb & Soffen ABSTRACT: Apparatus for feeding, welding and cutting metallic ribbon which is extremely thin. The ribbon is advanced by automatic means so that a portion thereof is nested within a slot which forms one electrode of a welding device. The welding operation is performed and then the ribbon is cut to length, the welded parts are then removed and the cycle is repeated. The means for accurately advancing the ribbon comprises a pair of rotatably mounted metallic rollers aligned along a common axis. At least one of the roller assemblies is comprised of first and second concentrically mounted rollers spaced by resilient means. The true centers of the rollers are displaced by a predetermined amount so as to provide constant tension for the feeding operation even in the case where the rollers deviate from true round which may be caused by wearing as a result of continued use.

PATENTED JUL 27 1971

INVENTOR
JEROME VINCENT VOLK

OSTROLENK, FABER, GERB & SOFFEN
ATTORNEYS

INVENTOR.
JEROME VINCENT VOLK
BY
OSTROLENK, FABER, GERB & SOFFEN
ATTORNEYS

TABBING MACHINE

The present invention relates to feeding, welding and cutting apparatus, and more particularly to novel apparatus for accurately feeding exact lengths of extremely thin metallic ribbon to a welding station where exact lengths of ribbon may be welded to another component and then cut to exact size after the weld, wherein the apparatus is designed for continuous repeated use.

There exist a variety of applications wherein it is required to repeatedly perform a particular operation such as in the case of mass production techniques. For example, in the cathode ray tube art, in order to fabricate the assemblies utilized in such cathode ray tubes at mass production rates, it becomes necessary to provide equipment for continuous repeated performance of certain operations wherein the parts formed and/or joined may be so formed and/or joined rapidly, accurately and reliably. For example, in the fabrication of electron gun assemblies, there are a large number of components which must be accurately positioned and aligned relative to other components. Once such components are so aligned, it then becomes necessary to weld the components in order to provide good mechanical and electrical connection therebetween. The electrical connection of many components within the electron gun is provided for by the welding of extremely thin metallic ribbon to such components. The metallic ribbon utilized in these applications is extremely thin and thereby necessitates careful handling in the performance of the welding operations. Since there are numerous welds required in the fabrication of each cathode ray tube electron gun, and since the number of electron guns being produced is quite large, it becomes necessary to provide equipment which can perform these operations both rapidly and reliably.

The present invention is characterized by providing equipment capable of rapidly feeding extremely thin metallic ribbon to a welding station where, subsequent to the welding operation, parts are accurately cut to length and the cycle is repeated in a rapid manner without affecting the integrity of the components being joined.

The present invention is comprised of equipment for automatically operating roller means which, upon actuation, operates to feed an extremely thin metallic ribbon to a welding station wherein the length of ribbon fed to the welding station is of an exact predetermined length for each feeding operation. After the weld is produced, the ribbon is cut to a predetermined length, and the cycle is repeated. In order to accurately and reliably feed exact lengths of the extremely thin metallic ribbon, the roller advancing means is comprised of a pair of cooperating rollers which moves or advances the ribbon therebetween. The centers of the rollers lie on a common axis and at least one roller assembly is comprised of a pair of metallic concentric rollers having a ring of resilient material therebetween. The centers of the pair of rollers are displaced toward one another by a predetermined amount in order to maintain constant tension on the metallic ribbon, even in the case where the rollers deviate from true round as a result of wear due to repeated usage. The equipment is designed to perform the advancing, welding and cutting operations in rapid and accurate fashion, thereby lending itself advantageously to mass production techniques.

It is, therefore, one object of the present invention to provide novel means for advancing, welding and cutting extremely thin metallic ribbon repeatedly and continuously, wherein the cut ribbon sections formed in each operation are each of an exact length.

Another object of the present invention is to provide novel means for feeding extremely thin metallic ribbon to a welding station by means of a roller assembly wherein the roller assembly includes at least one resiliently mounted roller displaced inwardly relative to a cooperating roller so as to maintain constant tension upon the metallic ribbon and accurately feed predetermined lengths of the ribbon even after wearing of the roller members as a result of repeated usage.

These as well as other objects of the present invention will become apparent when reading the accompanying description and drawings in which.

Figure 1:
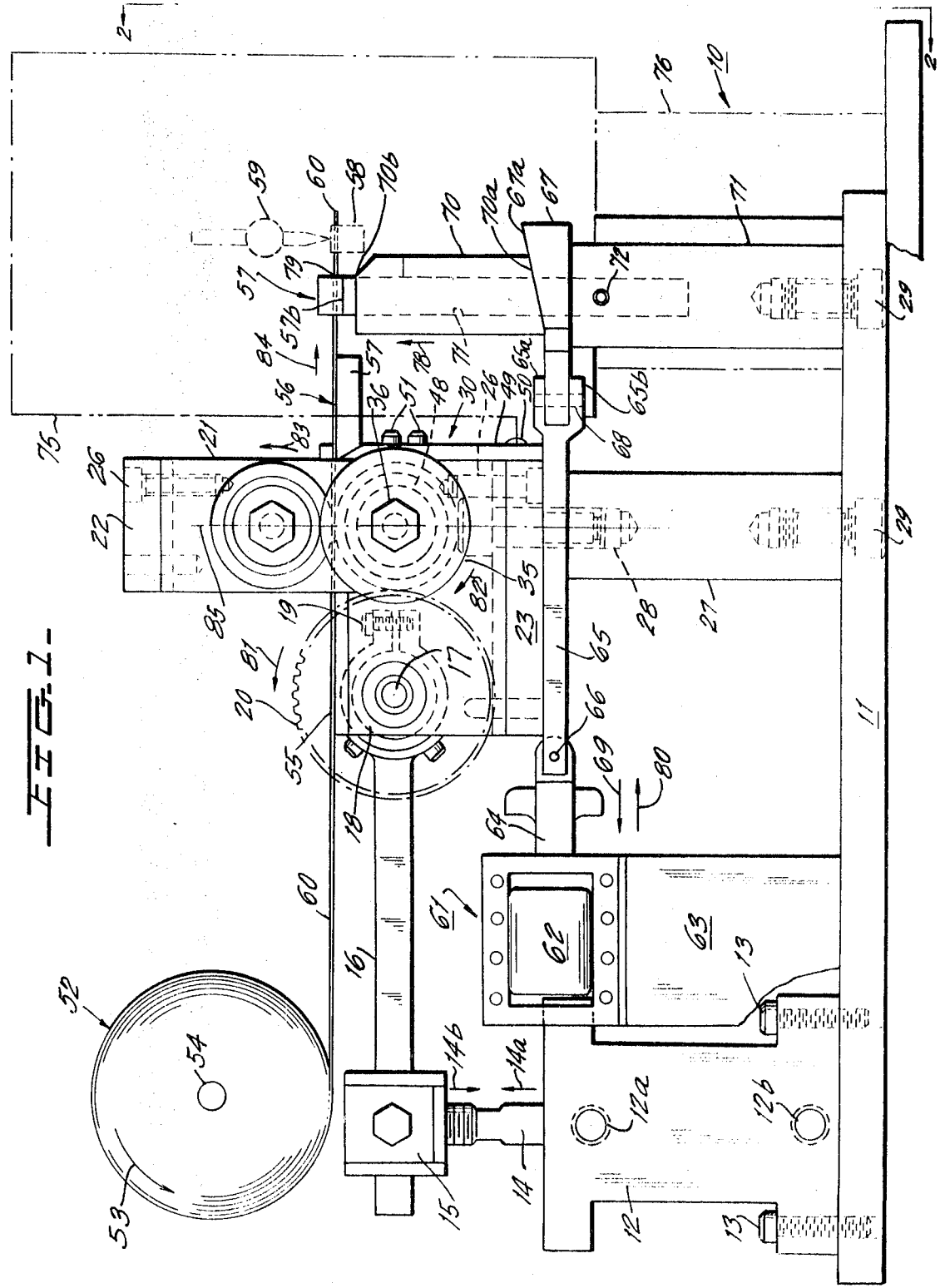
FIG. 1 is an elevational view of a ribbon feeding machine incorporating the principles of the present invention.
Figure 2:
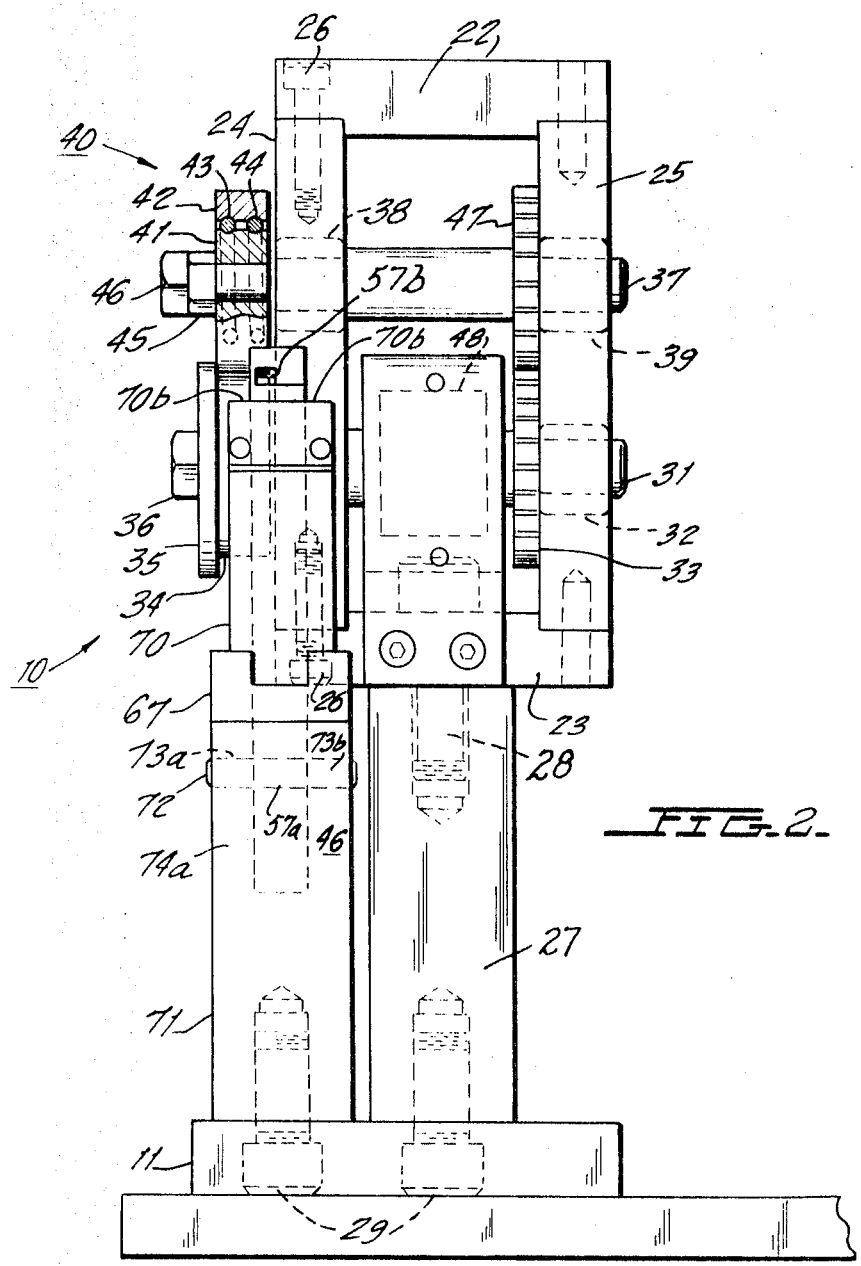
FIG. 2 is an end view of the ribbon feeding machine of FIG. 1.

The ribbon-feeding machine 10, as shown in FIGS. 1 and 2, is comprised of a base or support member 11 which may be mounted upon a platform or other horizontal surface for supporting the machine. An air cylinder 12 is secured to base 11 by fastening means 13,13 so as to be rigidly mounted thereto. Although not shown in detail, it should be understood that air cylinder 12 is comprised of a hollow, cylindrical bore (not shown) having a piston (not shown) mounted for reciprocal movement therein. This piston is rigidly secured to a rod 14 whose upper threaded end is, in turn, secured to an arm guide 15. Air cylinder 12 is provided with first and second openings 12a and 12b for coupling to a suitable air pressure source (or sources, not shown) which operate in a manner such that the introduction of air under pressure into opening 12b urges arm 14 vertically upwardly, as shown by arrow 14a. The termination of the introduction of air pressure into opening 12b and the initiation of the introduction of air pressure into opening 12a causes arm 14 to move vertically downward, as shown by arrow 14b, to return to the solid line position of FIG. 1. This operation serves to advance the metallic ribbon in a manner to be more fully described.

The arm guide 15 is provided with a horizontally aligned slot (not shown) for receiving lever arm 16 which may be rigidly secured to arm guide 15 by means of a fastening member 17 threadedly engaging a tapped aperture (not shown) provided in one vertical surface of arm guide 15 and bearing against one surface of lever arm 16 to rigidly mechanically join elements 15 and 16. In this manner, the upward vertical movement of arm 14 is imparted to lever arm 16 through arm guide 15, causing lever arm 16 to rotate clockwise (relative to FIG. 1) about shaft 17. Arm 16 is clamped to shaft 17 by means of a lever clutch clamp assembly 18 further secured by fastening means 19. Also rigidly mounted to shaft 17 is a gear 20 which is designed to rotate in the clockwise direction (relative to FIG. 1) each time arm 16 rotates about shaft 17 in the clockwise direction. The operation is such that the upward vertical movement of rod 14 causes arm 16 to pivot in the clockwise direction about shaft 17. This movement is imparted through shaft 17 to gear 20 until the rod 14 moves to its uppermost position. Upon the downward vertical movement of rod 14, the clutch assembly 18 decouples lever arm 16 from shaft 17, imparting no rotation to the shaft and thus holding gear 20 motionless until the next upward vertical movement of rod 14.

The feed roller housing 21 is comprised of top and bottom plates 22 and 23 secured to vertically aligned sideplates 24 and 25 by fastening means 26. Housing 21 is secured to a housing support 27 by fastening means 28 which passes through an opening in bottom plate 23 and threadedly engages a tapped aperture provided in the top end of housing support 27. The bottom end of housing support 27 is secured to the baseplate 11 by fastening means 29 which passes through an opening in the base plate and threadedly engages a tapped opening provided in housing support 27.

The sideplates 24 and 25 rotatably mount a plurality of shafts such as, for example, shaft 17 which is journaled within suitable bearings (not shown) provided within the sideplates. A first roller assembly 30 is comprised of a shaft 31 journaled within suitable bearings 32 provided in the sideplates 24 and 25 (only one of which are shown in FIG. 2). The gear member 33 is rigidly secured to shaft 31 so as to rotate in unison therewith under control of gear 20 in a manner to be more fully described. A lower roller 34 is mounted upon the left-hand end of shaft 31 (relative to FIG. 2) and is positioned adjacent the outside face of sideplate 24. A roller guard 35 is, in turn, mounted against the outside face of roller 34 and is held in position by fastening means 36.

The upper roller assembly is comprised of a shaft 37 journaled within the bearings 38 and 39 provided in sideplates 24 and 25, respectively. The upper roller assembly 40 is comprised of an inner roller 41 rigidly secured to shaft 37, an outer roller 42 and a pair of resilient "O"-rings 43 and 44 positioned between the outer periphery of roller 41 and the inner periphery of roller 42. The entire roller assembly 40 is secured to shaft 37 by a pair of nuts 45 and 46. A gear 47 is rigidly secured to shaft 37 and meshes with gear 33 mounted on shaft 31 to operate in a manner to be more fully described.

A slip clutch 48 is mounted to shaft 31 and is provided for holding roller 34 motionless during the return stroke of rod 14 in a manner to be more fully described. A support 49 for shaft 31 is fastened to bottom plate 23 by fastening means 50 for securing the clutch clamp and by fastening means 51 for securing the bracket of slip clutch 48.

Figure 3:
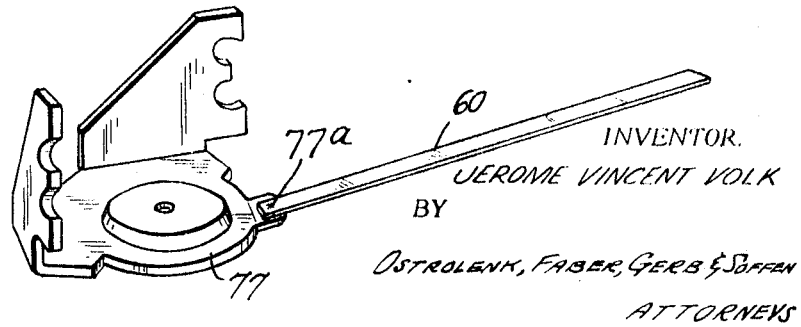
FIG. 3 is a perspective view showing a typical electron gun component welded to a ribbon section through the use of the method and apparatus of the present invention.

The extremely thin metallic ribbon is wound about the ribbon feed roller 52 positioned to rotate counterclockwise, as shown by arrow 53, about its center shaft 54. The ribbon is fed from the bottom of the feed roller toward the right where it is maintained in alignment within a plate having a ribbon feed guide 55. The ribbon then passes between the outer surfaces of roller 42 and roller 34 and within a slot provided as a front guide 56 for the ribbon in member 57 which is integrally joined to shaft support plate 49. The ribbon then passes through a cutter 57 so that its forward end may nest within a slot provided in one electrode 58 of a welding unit. The other electrode 59 is positioned immediately above electrode 58 so that its tapered lower end is positioned directly above the ribbon 60. The electrodes, when electrically energized, weld the ribbon section to a second member (at location 77a.) so as to form the subassembly shown in FIG. 3.

The cutting operation is controlled by an electrically operated solenoid assembly 61 having a coil 62 mounted upon solenoid support 63 which, in turn, is rigidly secured to base member 11. The solenoid selectively operates an armature 64 coupled to a cutter wedge arm 65 linked to armature 64 by a pin 66. The forward end of cutter wedge arm 65 is mechanically coupled to a cutter wedge 67 by a fastening pin (not shown) passing through openings in the bifurcated portions 65a and 65b of arm 65 and embracing the left-hand end of cutter wedge 67, which openings are in alignment for receipt of the fastening pin, as shown by the numeral 68 in FIG. 1. Armature 64 is based by suitable means (not shown) so as to be normally in the solid line position of FIG. 1 when the solenoid coil 62 is deenergized. Upon energization of the solenoid coil by a switch, foot pedal or other suitable means, armature 64 is moved toward the left, as shown by arrow 69, causing the cutting wedge 67 to move in the left-hand direction. The inclined surface 67a of cutter wedge 67 bears against a similarly inclined surface 70a provided along the underside of cutter body 70.

The cutter body 70 is provided with an elongated, rectangular-shaped opening 71 through which cutter guide 57 passes. The lower portion of cutter guide 57 is coupled to cutter support 71 by means of a coupling pin 72 which is passed through suitable openings 73a and 73b in the bifurcated portions 74a and 74b of cutter support 71, and through a suitable opening 57a provided in cutter guide 57 which is in alignment with openings 73a and 73b. Cutter guide 57 is provided with a rectangular-shaped slot 57b near its upper end. Ribbon 60 passes through slot 57b while being moved into the slot provided in welding electrode 58 into which it is nested in readiness for the welding operation. The cutting edge of cutter body 70 is located at 70b and operates in a manner to be more fully described hereinbelow.

The operation of the feeding, welding and cutting equipment is as follows:

Let it be assumed that the extremely thin metallic ribbon has been fed to the slot in electrode 58 where it is nested in readiness for the welding operation. The welding unit 75 mounted adjacent the feeding and cutting machine 10 by a suitable support 76, is energized, causing a large electrical potential to appear across the welding electrodes 58 and 59 to weld the forward end of ribbon 60 to a grid member 77, the welded elements being shown in final assembled form in FIG. 3.

After completion of the welding operation which joins element 60 and 77, solenoid coil 62 is energized, causing its armature 64 to move in the direction shown by arrow 69 against a biasing force provided by a spring or other suitable means (not shown). This movement causes cutting wedge 67 likewise to move in the direction shown by arrow 69. Its inclined surface 67a bears against surface 70a of cutter body 70, causing the cutter body to move vertically upward in the direction shown by arrow 78. Cutter wedge 67 is bifurcated and cutter guide 57 passes between the bifurcated arm portions so as to experience no vertical movement during the sliding movement of cutting wedge 67 and the upward vertical movement of cutter body 70. The cutting edge 70b makes sliding engagement with the right-hand vertical surface of cutter guide 57, passing through the ribbon 60 at point 79 and moving slightly above the right-hand end of slot 57b so as to cleanly cut the right-handmost section of ribbon 60 from the remaining ribbon being fed through the mechanism from feed roller 52.

The deenergization of solenoid coil 62 causes its armature 64 to be moved in the right-hand direction, as shown by arrow 80, under control of the biasing means provided therein. This causes cutting wedge 67 to move to the solid line position shown in FIG. 1, thereby allowing the cutter body 70 to move vertically downward and return to the solid line position of FIG. 1.

The two welded components 60 and 77 are removed from the welding unit and air cylinder assembly 12 is activated by the injection of air pressure into opening 12a, causing rod 14 to move vertically downward, as shown by arrow 14b. This movement is imparted to lever arm 16, causing the arm 16, shaft 17 and gear 20 to rotate in the counterclockwise direction about the axis of shaft 17. This counterclockwise rotation is imparted to gear 33 which meshes with gear 20, causing gear 33 to rotate in the clockwise direction, as shown by arrow 82. Gear 33 also meshes with gear 47, causing this gear to rotate in the counterclockwise direction, as shown by arrow 83. The ribbon 60 which passes between the roller 34 and roller assembly 40 is thereby advanced to be fed in the direction shown by arrow 84 so as to be moved into the slot provided in welding electrode 58 in readiness for the next welding operation. A very significant feature of the ribbon-feeding assembly resides in the fact that constant tension is maintained between the roller assemblies and hence upon the metallic ribbon passing therebetween, by the arrangement of the roller assemblies. As shown best in FIG. 1, the centers of roller 34 and roller assembly 40 are aligned along a common vertical axis represented by the phantom line 85. The distance between the centers of roller 34 and roller assembly 40 is equal to the center-to-center mounting distance between the rollers when just touching one another minus a finite distance which, in one preferred embodiment, is 0.010 inch. By displacing the center-to-center mounting distances by this small amount, constant tension is maintained therebetween. This slightly offcenter mounting is absorbed by the resilient "O"-rings 43 and 44 which act to maintain the proper tension and cause the ribbon to be fed by an accurate amount, in spite of wearing of the outer roller 42 and roller 34 which may occur as a result of continued use. This arrangement has been found to be capable of feeding, in the preferred embodiment, the extremely thin metallic ribbon (which, in the preferred embodiment, has a thickness of 0.002 inch and a width of 0.06 inch) by exactly 11/16 of an inch each time the air cylinder is activated to feed the ribbon.

After advancing of the ribbon 60 in the manner described hereinabove, air pressure is released from opening 12a in the cylinder and injected into opening 12b to cause the connecting rod 14, arm guide 15 and lever arm 16 to be moved vertically upward and return to the starting position shown in solid line fashion in FIG. 1. During this movement, the slip clutch assembly 18 mounted between arm 16 and shaft 17 decouples the clockwise rotation of arm 16 about shaft 17 from shaft 17, preventing the rotation of gear 20. Concurrently with this operation, the slip clutch assembly 48 mounted to shaft 31 further restrains roller 34 from experiencing any movement in the counterclockwise direction (relative to FIG. 1) to thereby hold roller 34 and roller assembly 40 motionless until the next advancing operation.

The above cycle is then repeated by a welding operation and a subsequent cutting operation. The welding, cutting and ribbon feeding operations may be rapidly repeated as frequently as necessary in order to join the associated electron gun pats.

Whereas the description of the preferred embodiment teaches the welding of a ribbon section to electron gun part 77, it should be understood that ribbon sections of differing lengths and thicknesses may be fed, welded and cut in a similar manner and be joined to other components, if desired, simply by providing a suitable supporting mount for the machine part to which the ribbon is to be joined.

It can be seen from the foregoing description that the present invention provides a novel automatic method for rapidly and accurately feeding extremely thin metallic ribbon and cutting the ribbon to exact predetermined lengths as rapidly and as frequently as is necessary. Rapid, accurate advancement of the extremely thin metallic ribbon is accomplished through the use of a metallic roller assembly in which the center-to-center mounting distance of the rollers is displaced by a predetermined amount to maintain constant tension upon the ribbon being fed and to accurately advance the ribbon in a repeated fashion, even in the case where slight wearing of the rollers may occur due to long, repeated use as a result of the provision of resilient means between the inner and outer rollers of the upper roller assembly.

Although this invention has been described with respect to particular embodiments, it should be understood that many variations and modifications will now be obvious to those skilled in the art, and, therefore, the scope of this invention is limited not by the specific disclosure herein, but only by the appended claims.

What I claim is:

1. Means for advancing an extremely thin metallic ribbon comprising:
    a thin elongated metallic ribbon;
    a first rotatably mounted roller assembly;
    a second rotatably mounted roller assembly;
    the centers of rotation of said first and second assemblies lying along an imaginary straight line;
    each of said first and second roller assemblies including a first metallic roller arranged to make rolling engagement with one another:
    means coupled to both said first and second roller assemblies for rotating said assemblies in opposing rotational directions to feed said ribbon therebetween;
    said first roller assembly further comprising resilient means positioned about the center of rotation of said first roller assembly and within the interior of its associated metallic roller;
    means for urging said roller assemblies toward one another to maintain constant tension on said ribbon for accurate feeding of the ribbon therebetween, said first roller assembly being further comprised of inner and outer concentric metallic rollers mounted to rotate substantially about the common center of rotation of said first assembly, said resilient means comprising first and second resilient "O"-rings arranged in spaced parallel fashion and surrounding the outer periphery of said inner roller and engaging the inner periphery of said outer roller.

2. The device of claim 1 wherein said rotating means comprises means for intermittently rotating both said first and second roller assemblies so as to intermittently feed said ribbon.

3. The device of claim 1 wherein said rotating means comprises:
    a first shaft;
    a lever arm having a first end secured to said first shaft and being mounted to rotate said lever arm and said first shaft about the axis of said first shaft;
    a first gear mounted upon said first shaft;
    means for reciprocally moving the free end of said lever arm;
    slip clutch means coupled between said lever arm and said first shaft for coupling said lever arm to said shaft when said lever arm is moved in a first direction and for decoupling said first shaft from said lever arm when said lever arm is moved in the opposite direction.

4. The device of claim 3 wherein said first and second roller assemblies are further respectively comprised of second and third gears for rotating their associated roller assemblies;
    said second gear being adapted to mesh with said first and third gears so as to rotate said first and second roller assemblies when said first gear is rotated.

5. The device of claim 4 further comprising second slip clutch means coupled between said second gear and the first roller of said second roller assembly to restrain said first and second roller assemblies from rotating when said lever arm is moving in said opposite direction.

6. The device of claim 1 further comprising means for cutting said ribbon after being fed through said roller assemblies.

7. The device of claim 1 further comprising a cutter guide positioned at the outfeed end of said roller assemblies and having an opening for receiving said ribbon whereby said ribbon passes through said opening as it is fed by said roller assemblies;
    a reciprocating cutter member arranged to slide across one end of said opening;
    means for moving said cutter member in a first direction across said opening when energized and for moving said cutter member in second direction away from said opening when deenergized.

8. The device of claim 1 further comprising a welding assembly positioned at the outfeed end of said roller assemblies, said welding assembly being comprised of first and second electrodes adapted to weld a portion of said ribbon to an associated part;
    at least one of said electrodes having a slot positioned to receive and support the free end of said ribbon fed thereto to facilitate the welding operation.

9. The device of claim 8 further comprising means for cutting the welded section of the ribbon positioned between said welding assembly and the outfeed end of said roller assemblies to separate the welded ribbon section from the remainder of said elongated ribbon.

10. The device of claim 1 wherein the distance between the centers of rotation of said first and second roller assemblies is equal to the radius of the outer roller of said first roller assembly plus the radius of the second roller assembly minus a finite length in the range from 0.005 to 0.015 inch.

11. The device of claim 1 wherein the distance between the centers of rotation of said first and second roller assemblies is equal to the radius of the outer roller of said first roller assembly plus the radius of the second roller assembly minus a finite length in the range from 0.005 to 0.015 inch and is preferably 0.010 inch.